(12) United States Patent
Korzeniowski et al.

(10) Patent No.: US 9,982,089 B2
(45) Date of Patent: May 29, 2018

(54) METHOD OF MANUFACTURING POLYESTER RESINS

(71) Applicant: CHEMENERGIA KORZENIOWSKI WACLAW, Tarnów (PL)

(72) Inventors: Waclaw Korzeniowski, Warsaw (PL); Lukasz Korzeniowski, Koszyce Male (PL); Krzysztof Korzeniowski, Warsaw (PL)

(73) Assignee: CHEMENERGIA KORZENIOWSKI WACLAW, Tarnów (PL)

( * ) Notice: Subject to any disclaimer, the term of this patent is extended or adjusted under 35 U.S.C. 154(b) by 0 days. days.

(21) Appl. No.: 15/116,991

(22) PCT Filed: Jan. 30, 2015

(86) PCT No.: PCT/PL2015/000012
§ 371 (c)(1),
(2) Date: Aug. 5, 2016

(87) PCT Pub. No.: WO2015/152743
PCT Pub. Date: Oct. 8, 2015

(65) Prior Publication Data
US 2017/0174830 A1    Jun. 22, 2017

(30) Foreign Application Priority Data
Apr. 1, 2014 (PL) .......................... 407734

(51) Int. Cl.
| C08G 18/38 | (2006.01) |
| C08G 18/28 | (2006.01) |
| C08G 63/60 | (2006.01) |
| C08G 63/78 | (2006.01) |

(52) U.S. Cl.
CPC ............ *C08G 63/60* (2013.01); *C08G 63/78* (2013.01)

(58) Field of Classification Search
CPC ................................ C08G 63/60; C08G 63/78
USPC ....................................................... 524/590, 35
See application file for complete search history.

(56) References Cited

U.S. PATENT DOCUMENTS

| 4,233,408 A | 11/1980 | Satterly et al. | |
| 2011/0028581 A1* | 2/2011 | Gnedin | C08G 18/092 521/157 |
| 2013/0042659 A1* | 2/2013 | Beatty | C05G 3/0029 71/64.02 |

FOREIGN PATENT DOCUMENTS

| PL | 932 48 | 8/1978 |
| PL | 162 632 | 12/1993 |
| PL | 193 760 | 3/2007 |
| PL | 211 684 | 6/2012 |
| WO | WO 2012/173 938 | 12/2012 |

* cited by examiner

*Primary Examiner* — William Cheung
(74) *Attorney, Agent, or Firm* — Horst M. Kasper, Esq.

(57) ABSTRACT

The subject of the invention is a method to manufacture polyester resins using a by-product formed during a process of oxidizing cyclohexane to cyclohexanol and cyclohexanone, which contains a mixture of carboxyl acids; the method comprises a heating process with the removal of water and low-boiling residues as well as a polycondensation process with di- and polyhydroxy alcohols under a reduced pressure; the method described is characterized by that a water layer is applied as a baseline material in the synthesis; the said water layer is separated from the residues left over after the hydrolysis of cyclohexyl esters contained in the cyclohexane oxidation product, and after the main components, cyclohexanol and cyclohexanon, have been first separated from the said product: thereafter, the water layer is condensed.

3 Claims, No Drawings

METHOD OF MANUFACTURING POLYESTER RESINS

This Application is a U.S. National Stage of International PCT Application No. PCT/PL2015/000012 filed Jul. 4, 2009, which claims benefit of the Poland Application No. PL385586 filed Jan. 30, 2015. All of these applications are hereby incorporated herein by reference in their entirety.

The subject of the Invention is a method to manufacture polyester resins. More specifically, the Invention refers to a method of manufacturing polyester resins from a by-product formed during a reaction of oxidizing cyclohexane to cyclohexanol and cyclohexanone; the by-product referred to contains a mixture of carboxyl acids; the method according to the Invention encompasses a heating process and a polycondensation process with di- and polyhydroxy alcohols under a reduced pressure.

Known methods of manufacturing polyester resins are based on a polyesterification reaction of polyhydroxy alcohols with di-carboxylic acids and/or their anhydrides, or with a mixture of aliphatic dicarboxylic acids, monocarboxylic acids, and hydroxy acids, their oligomers, keto acids, cyclohexyl esters of the mentioned acids that contain substantial amounts of high boiling contaminants; the mixture of those compounds is excreted as a by-product at different phases of the cyclohexane oxidation reaction under a normal or a reduced pressure, in the presence of a catalyser, and at a temperature between 160 and 250° C., where the water excreted during the polyesterification reaction is removed together with low boiling substances from the reaction environment; and, what very important, the by-product under this Invention is formed at phases different from the phases, at which all the above mentioned by-products are formed.

In the well known methods, a by-product, usually applied to manufacture polyester resins, is a mixture of acids and esters abstracted after the concentration phase and prior to or during the hydrolysis under the process of oxidizing cyclohexane to cyclohexanol and cyclohexanone.

Two Polish patents are known: No. PL93248 B1 and No. PL162632 B1. According to the first Patent, a by-product used to manufacture polyester resins is the one from the cyclohexane oxidation reaction formed at the final stage of the oxidation process, i.e. after acid hydrolysis. Under the Invention disclosed in the Polish Patent No. PL 93248 B1, the method of manufacturing resins consists of two phases; during the first phase, the mixture of carboxyl acids is heated under a reduced pressure and in the atmosphere of an inert gas, along with removing water and low boiling substances; during the second phase, the residues produced are heated up in the presence of an inert gas and under a reduced pressure, and, here, a product is formed that shows a very high acid number being below 6 KOH/g; in the second Polish patent No. PL162632 B1, a method is disclosed, which consists in heating polyhydroxy alcohols with a mixture of acids and esters under an atmospheric pressure and, therefore, the process yield achieved is higher; however, the resin produced contains an increased amount of water, which causes the polyesters with ester bonds to undergo a process of hydrolysis. This method of synthesis reaction decreases both the product's useful life duration and physical-chemical parameters of the resins being produced. The two above indicated Patents disclose methods of manufacturing polyesters from by-side products formed during the reaction of oxidizing cyclohexane to cyclohexanol and cyclohexanone. However, the difference between them consist in that in the process according to the description of Patent No. PL162632 B1, a by-product, i.e. a mixture of acids and esters (colloquially named MAE), derived from the hydrolysis process of cyclohexyl esters contained in the product of cyclohexane oxidation reaction, is, at first, distilled with steam, preferably a superheated steam, in order to desorb volatile substances and only then the by-products undergo the polycondensation reaction with a mixture of di- and tri-hydroxy alcohols, preferably in the presence of phosphoric acid to be applied in the amount of 0.5% by weight.

The Polish Patent No. PL 193760 B1 describes a method to manufacture polyester resins from by-products formed during a cyclohexane oxidation reaction (those by-products contain aliphatic dicarboxylic acids with 4-6 carbon atoms in one molecule, hydroxycaproic acid, aldehyde acids, cyclohexyl esters of the listed acids, ketones and tar substances; they are heated together with polyhydroxy alcohols); the by-products are dehydrated in the presence of hypophosphorous acid and in an atmosphere of inert gas; next, a reaction is carried out with polyhydroxy alcohols under an atmospheric pressure, in an atmosphere of inert gas. Thus, primarily, Co and Cr salts are converted into phosphates in order to prevent the compounds in the said mixture from further oxidation at the stage of its dehydration prior to the esterification reaction with alcohols.

Another method is known from the U.S. Pat. No. 4,233,408(A); in this Patent, a method is described how to manufacture polyurethane (PU) foams from polyester precursors derived from one of many possible by-products formed during a process of manufacturing adypic acid. The method according to the Invention as disclosed in the U.S. Pat. No. 4,233,408(A) is based on residual non-volatile substances, including acids separated from the cyclohexane oxidation products, left over after cyclohexanone and cyclohexanol were separated, and it involves a process of salting out those residual substances with NaCl or a process of freezing them for the purpose of reducing the content of water therein.

Another method of manufacturing polyester resins is known from the Polish Patent No. PL 211684 B1; although the method as disclosed in the said Patent is based on a by-product derived from the cyclohexane oxidation reaction, yet, the by-product stream containing acids is separated as an aqueous extract from the cyclohexane oxidation product at the stage when the raw product is rinsed with water and, next, condensed to 80-90% by means of evaporating water and volatile substances. The amount of cyclohexyl hydroperoxides in the aqueous extract separated may be up to 0.5% by weight; while the extract is concentrated and stored, those cyclohexyl hydroperoxides contained therein decompose and produce an undesirable thermal effect and, also, cause the amount of high-boiling contaminants to increase and the colour of the solution to significantly darken; the colour darkening of the solution reduces its industrial applications.

The description of the Invention No. WO2012173938 A1 discloses numerous solutions referring to the manufacture of polyester resin mixtures with the use of a cyclohexane oxidation reaction's by-product formed during industrial production processes of adypic acid and caprolactam; the by-product in the form of aqueous extracts and residual non-volatile substances was used as a baseline substance to manufacture those polyester resin mixtures. In the document discussed, various by-product streams of the cyclohexane oxidation process are disclosed including two streams with CAS numbers (Chemical Abstract Service) assigned to them as their ID and denoting the individual chemical substance. The Invention represents also a method of manufacturing polyester resins with an initial phase during which methanol is applied to react with a by-product stream and to convert its components into a methanol solution, so as to better identify those components during the ongoing manufacturing process.

Under the methods as listed above, there are manufactured polyester resins characterized by a very strong odour, dark colour, insufficient thermal stability of the foams made thereof, high level of near mould-wall shrinkage, and by strongly varying values of other essential parameters. This is attributed to the fact that the resins, produced using the above methods with the application of by-products derived from the cyclohexane oxidation process, are based on a mixture of esters and acids, which is a mixture of nearly all inner by-product streams of that process including a large amount of tar-like substances that are excreted in the form of residues at the stage of hydrolysis of cyclohexyl esters contained in the product of cyclohexane oxidation reaction in the presence of steam.

Hereinbefore, it is disclosed that diverse by-products are applied to manufacture polyester resins; such by-products are formed during the process of oxidizing cyclohexane to cyclohexanol and cyclohexanone since it is generally known that the reaction of oxidizing cyclohexane is a multi-stage, highly exothermic process with a number of after-reactions, i.e. the product from one reaction becomes a baseline material for the next stage reaction. Cyclohexanol and cyclohexanone are the basic oxidation products. At the same time, a number of oxidation side-reactions and oxidation product conversion processes take place; as a result, a final mixture produced contains not only the required products, but, also, various amounts of oxidation products, among other things: a mixture of carboxylic acids that are a group of organic chemical compounds with a COOH carboxyl group.

According to the Invention at issue, a mixture of carboxylic acids is applied as a baseline substance; that mixture is a by-product derived from the process of oxidizing cyclohexane to cyclohexanone and cyclohexanol and it essentially differs, in its qualitative and quantitative chemical composition, from the hitherto applied substances; it is also characterized by a lower content of water and of non-identified compounds, among other things, of tar substances.

According to the Invention being disclosed, the method of manufacturing polyester resins with the use of a by-product formed as a mixture of carboxylic acids during the cyclohexane oxidation reaction comprises a heating process including a reaction of removing water and low-boiling residues and a polycondensation reaction with di- and polyhydroxy alcohols under a reduced pressure; the method is characterized by that as a baseline substance in the polycondensation process, a water layer is applied; that water layer is separated from the residues left over after the hydrolysis of cyclohexyl esters contained in the product of cyclohexane oxidation reaction and after the main components: cyclohexanol and cyclohexanone are extracted from the said product of cyclohexane oxidation reaction; thereafter, the water layer is concentrated.

Preferably, the baseline substance used in the method according to the Invention contains: adypic acid amounting to 20-27% by weight, 6-hydroxycaproic acid amounting to 10-15% by weight, valeric acid amounting to 10-13% by weight, butyric acid amounting to max 4.5% by weight, acetic acid in the amount of 2-3% by weight, hexanoic (caproic) acid in the amount of 1 to 3% % by weight, formic acid amounting to max 1.5% by weight, succinic acid amounting to max 1% by weight, propanoic (propionic) acid in the amount of max 1% by weight, isovaleric acid amounting to max 0.5% by weight, other non-identified compounds in the amount of 24-25% by weight such as: oligomers, ketoacids, cyclohexanone dimmers, and other compounds including tar substances, and water amounting to 10-22% by weight in terms of total weight of the mixture.

Preferably, under the method according to the Invention, during the polycondensation phase, monofunctional compounds are recovered as a by-product that can be utilized either as a raw material in other synthesis reactions or as a commercial product.

In the method according to the Invention, the baseline substance used in the polycondensation process is a by-product from the reaction of oxidizing cyclohexane to cyclohexanol and cyclohexanone; that by-product is separated as a water layer from the residues left over after the hydrolysis of cyclohexyl esters contained in the cyclohexane oxidation product after the main components thereof, i.e. cyclohexanone and cyclohexanol have been separated from it, and, next, the residues are condensed in a known manner. The by-product contains the following amounts of individual components in terms of the total weight of the mixture: adypic acid: 20-27% by weight; 6-hydroxycaproic acid: 10-15% by weight; valeric acid: 10-13% by weight; butyric acid: max 4.5% by weight; acetic acid: 2-3% by weight; hexanoic (caproic) acid: 1 to 3% % by weight; formic acid: max 1.5% by weight; succinic acid: max 1% by weight; propanoic (propionic) acid: max 1% by weight; isovaleric acid: max 0.5% by weight, other non-identified compounds such as: oligomers, ketoacids, cyclohexanone dimmers, and other compounds including tar substances: 24-25% by weight; and water: 10-22% by weight.

Table 1 below represents a sample composition of the by-product stream as applied under the method according to the Invention.

TABLE 1

| Compound | Stream composition acc. to Invention [% m/m] | Generalized content of components in streams of by-product used according to Invention in % by weight |
|---|---|---|
| 6-hydroxycaproic acid | 14.6 | 10-15 |
| Adypic acid | 26.8 | 20-27 |
| Succinic acid | 0.78 | do 1 |
| Propanoic (propionic) acid | 0.61 | do 1 |
| Formic acid | 0.41 | 1.5 |
| Acetic acid | 2.43 | 2-3 |
| Butyric acid | 0.21 | do 4.5 |
| Keto valeric acids | — | — |
| Valeric acid | 12.8 | 10-13 |
| Isovaleric acid | 0.21 | 0.5 |
| Kwas kapronowy | 2.61 | 1-3 |
| Cyclohexyl valerate | — | — |
| Water | 14.00 | 14-22 |
| Other non-identified compounds | 24.54 | 24-25 |
| TOTAL [% m/m] | 100 | 100 |

While analyzing the data contained in Table 1 above, it should be stressed, based on the components listed in the first column in Table 1, that the amount of water is lower which highly advantageously impacts the by-products' parameters (compared to other raw materials utilized in prior art Inventions disclosed including the description of the Invention No. PL 211684 B1); this fact helps reduce the level of energy consumption by the entire polyester resins manufacturing process according to the Invention. Furthermore, the amounts of non-identified compounds are also lower, which means that once water and monoacids are removed, the baseline product is better saturated with di-carboxylic acids, thus, the quality of the polyester being manufactured is improved, too.

The method of manufacturing polyester resins according to the Invention consists in that the baseline product, qualitatively and quantitatively made up of the components as listed above, its acid number being 200-400 mg KOH/g, preferably 250-350 mg KOH/g, and the most preferably 270-310 mg KOH/g, is heated at a temperature between 115 and 185° C. to remove water and volatile substances, and, next, it undergoes a polycondensation reaction with di- and polyhydroxy alcohols under a reduced pressure, at a temperature ranging from 160 to 270° C. This heating stage includes a step of heating up to a temperature of 115-125° C.; this step is connected, mainly, with the dewatering and removal of the majority of low-boiling compounds under the atmospheric pressure (1013 hPa), in an atmosphere of inert gas, preferably nitrogen, by means of a normal distillation reaction.

Di- and/or polyhydroxy alcohols are added to the major product and the heating process continues at a temperature from 160 to 270° C., more preferably between 185 and 210° C.; next, the temperature is quickly increased to ca. 185° C. in the presence of inert gas, preferably nitrogen, and the condensation water is removed by means of a normal distillation reaction; the process of water removal from the product is monitored until the content of water in the product is less than 0.1%; the pressure is gradually decreased to a value below 1013 hPa, preferably to 50 hPa, and more preferably to 30-50 hPa, and the most preferably to 37 hPa. At this stage, water is also excreted along with low-boiling substances. In both cases, once the vacuum is fully graded, the right phase of heating begins.

The heating continues at a temperature of 185° C., under a reduced pressure, until the product's acid number is less than 2 mg KOH/g, preferably less than 1 mg KOH, and the most preferably less than 0.5 mg KOH depending on the planned application of resins, and until the hydroxyl value is between 30 mg KOH/g and 600 mg KOH/g depending on the planned application of resins.

Along with removing the reaction water, monofunctional compounds are also removed under a reduced pressure; those monofunctional compounds enrich the yield of monoacids recovered during reaction. The fractions of acids, such as valeric acid, recovered in this manner, might be further treated using a single process, for example: extraction and/or distillation and/or rectification and/or crystallization process, and, finally, they might be utilized as a raw material for a different synthesis or as a commercial product.

Depending on the planned application of polyester resin, various di- and/or polyhydroxy alcohols with two hydroxyl groups in one molecule are used, preferably monoethylene glycol and/or ethylene glycol and/or propylene glycol and/or butylene glycol, as well as polyhydroxy alcohols with three or more hydroxyl groups in one molecule, such as trimethylolpropanol (TMP) and/or glycerine and/or pentaerythritol and/or sorbitol (also known as glucitol), as well as linear or branched oligoestrols.

Depending on the planned application of the resin produced, di-carboxylic acids or their anhydrides might be used together with the above named alcohols, preferably adypic acid, sebacic acid, terephthalic acid, isophthalic acid, phthalic anhydride, and maleic anhydride.

During the process, the content of water is monitored so as to obtain a water content value below 0.1%; here, depending on what is needed, from among catalysts known to experts in this domain of chemistry, a most suitable catalyst should be applied from the groups comprising Lewis acids, or metal oxides, or zeolites, or silicates, or quaternary ammonium salts, crown ethers, metal organic compounds, and metal salts.

The polyester resins manufactured according to the method disclosed in the Invention are applied mainly to produce polyurethane foams, and, also, other types of high quality polyurethanes such as: microporous elastomers, cast elastomers, flexible polyurethane foam, integral foam, and rigid foam.

One advantage of the method of manufacturing polyester resins according to the Invention is that it is more cost-efficient compared to other known methods, since it does not require additional energy-consuming treatment phases except for the possible recovery of monoacids from the baseline stream (which is characterized by a high content of those monoacids), which also consumes energy, but not more than the normal distillation process of water and low-boiling substances. Another strong point of the process under the Invention is the recovery of raw material, in particular of monoacids.

The method according to the Invention is disclosed in the examples of the embodiments of the Invention.

In one of the examples of the Invention embodiment, the recovery process of monoacids is characterised as are their further applications, i.e. when the monoacids being removed are not a waste but a half-product to be utilized in some other synthesis processes or, after a completed single treatment process, they can be used as a commercial product.

EXAMPLE 1

The baseline product in the form of a concentrated mixture of carboxyl acids, their profile (quantitative and qualitative composition) as described above, their acid number ranging from 270 to 310 mg KOH/g, was heated up to a temperature of 125° C. in order to remove the majority of water and low-boiling substances. Next, the monoethylene glycol and diethylene glycol were added at a molar ratio of 6:4. The resulting mixture was distilled under the atmospheric pressure, in an atmosphere of nitrogen, and heated up to a temperature of 185° C. so as to obtain a water content level below 0.1%. As soon as the planned water content level was obtained, the pressure was gradually reduced to a level of 37 hPa with the continuous heating of the product at a temperature between 185 and 210° C. so as to obtain the following parameters of the product: value of a product's acid number below 1 mg KOH/g, water content level below 0.05%, hydroxyl value ranging from 55 to 60 mg KOH/g, and viscosity between 8000 and 12000 mPas w 35° C. In this way, a resin product was produced that was characterized by a high ultimate tensile strength (UTS) of 2.8 N/mm$^2$ and a 600% elongation; based on those parameters, it is possible to apply this resin product to microporous elastomers.

The tensile strength and elongation tests were performed where the polyester, produced according to the method of the Invention, was used as a polyol component in the shoe industry; its hardness being 55-65 ShA and its forming density being 0.43.

EXAMPLE 2

The baseline product in the form of a concentrated mixture of carboxyl acids, their profile (quantitative and qualitative composition) as described above, their acid number ranging from 270 to 310 mg KOH/g, was heated up to a temperature of 125° C. in order to remove the majority of water and low-boiling substances through a normal distillation process. Next, a mixture of monoethylene glycol and trimethylolpropanol (TMP) was added at a molar ratio of 9:1; then, the mixture was distilled under the atmospheric pressure, in an atmosphere of nitrogen, and heated up to a temperature of 185° C. so as to obtain a water content level below 0.1%.

Once the required level of water content was reached, the pressure was gradually decreased so as to obtain a pressure value of 37 hPa, the heating of the product continued at a temperature between 185 and 210° C. so as to obtain a value of the product's acid number below 1 mg KOH/g, a level of water content therein below 0.05%, and the product's hydroxyl value ranging between 63 and 68 mg KOH/g. The resin produced using the method of the Invention is characterized by the increased functionality, high elasticity of 25%, and a 160% elongation; therefore, this resin can be utilized in flexible foams. The percent elongation test was performed according to the Polish standard 'PN-EN ISO 1798:2001'.

EXAMPLE 3

The baseline product as used in the Examples 1 and 2, its acid number being between 270 and 310 mg KOH/g, was heated up to a temperature of 125° C. for the purpose of removing water and low-boiling substances by means of a normal distillation reaction. Next, diethylene alcohol, glycerine, and phthalic anhydride were added at a molar ratio of 3:5:2. The mixture was further heated up to a temperature of 185° C. in an atmosphere of nitrogen, under the atmospheric pressure so as to obtain a level of water content below 0.1%. As soon as the planned parameters of the product were achieved, the pressure was gradually decreased to 37 hPa, the heating continued at a temperature between 185 and 210° C. until the value of the product's acid number was below 2 mgKOH/g, the level of water content therein was below 0.05%, and the hydroxyl value ranged from 240 to 260 mg KOH/g. The resin produced is characterized by the increased compressive strength, high coefficient of miscibility with physical foaming agents (for the agent type 245 fa, it is 80%, and for the agent type 365 mfc: 40%); therefore, this particular resin can be used in rigid foams.

EXAMPLE 4

The baseline product as used in the Examples 1 and 2, its acid number being between 270 and 310 mg KOH/g, was gradually heated up to a temperature of 185° C. in the system with a rectifying column, under the atmospheric pressure. Individual fractions, among other things, the water and acids fractions, preferably valeric acid fractions were collected at various heating stages; the fractions were differentiated by the boiling point. Then, the temperature was decreased to 125° C. and the diethylene glycol was added, at a molar ratio 3:1, calculated on adipic acid. The mixture was heated again, to a temperature of 185° C., in an atmosphere of nitrogen as an inert gas, under the atmospheric pressure so as to reach the level of water content in the mixture below 0.1% by a normal distillation process. Once the necessary parameters were obtained, the pressure was gradually decreased and the heating continued in a temperature between 185 and 210° C. so the value of the product's acid number was below 1 mgKOH/g, the water content below 0.05%, and the hydroxyl value ranged from 40 to 42 mg KOH/g. While removing the reaction water under a reduced pressure, monofunctional compounds were also removed, which enriched the yield of monoacids recovered during the reaction. The acid fractions, obtained in this manner, might be subjected to single treatment processes, such as extraction, distillation, rectification, and crystallization, and, then, they can be applied as a raw material in a different synthesis reaction or they might be a commercial product.

COMPARATIVE EXAMPLE 5

According to the Invention disclosed in U.S. Pat. No. 4,233,408(A), preferably, a process of salting out or freezing the product should be applied at the initial phase of the entire process; those processes are additional single processes preceding the chief reaction, they have an effect on the composition of the mixture and they might have also an effect on the quality thereof. A typical composition of the mixture of acids (a baseline product) is as follows: hydroxy acids: 65%; dicarboxylic acids: 25%; monoacids: 5%; mixture of lactones, esters, and salts including cyclohexane: 5%. In the method described, the top of the column was kept at a temperature level of 100° C. all the time during the ongoing process. In large part, the composition of the mixture during the process is time-invariant. Maintaining the top of the column on a 100° C. temperature level makes it possible to distil, purely and simply, the reaction water and, also, compounds that boil below this temperature level. During the polyesterification reaction, no vacuum was applied, therefore, the removal of water was less efficient. The polyesters, produced in this manner, were characterized by a value of acid number lower than 5 mg KOH/g and a hydroxyl value ranging from 250 to 500 mg KOH/g. The hydroxyl value as indicated above confirms a low value of molecular weight. The resin produced according to the method described, and more specifically, its characteristics allow only for limited applications thereof.

COMPARATIVE EXAMPLE 6

Pursuant to the description No. PL 211684 B1, a source of baseline material is a by-product of oxidizing cyclohexanol and cyclohexanone, obtained by washing a raw product of cyclohexane oxidation at the stage, when it leaves the oxidation reactor and by condensing water extract to 80-90% by the evaporation of water and, simultaneously, by removing volatile substances. The composition of the compared material for PL 211684 B1 is as follows: 6-hydroxycaproic acid and its oligomers amounting to 25-35% % by weight; adypic acid amounting to 20-30% by weight; keto acids and cyclohexanone dimmers in the amount of 25-30% by weight; succinic, hexanoic (caproic), and valeric acids amounting to 3-5% by weight; glutaric acid in the amount of 3-6% by weight; 10-20% of water; in the material being compared, the content of monoacids is lower than in the baseline material applied according to the Invention. The stream applied in the method according to the Invention is characterized by a high content of keto acids and cyclohexanone dimers, which represent—pursuant to the Invention—non-identified compounds and which negatively affect the properties of the resins produced. A different composition of by-product streams determines both the manner of how the process should be carried out and the composition of the mixture formed after the dehydration reaction (during the dehydration reaction, compounds of low molecular weight are removed, for example monoacids), which is the target material for the process of manufacturing polyester resins.

What is claimed is:

1. The method to manufacture polyester resins using a by-product formed during a process of oxidizing cyclohexane to cyclohexanol and cyclohexanone, which contains a mixture of carboxyl acids, and this method comprises a heating process with the removal of water and low-boiling residues, as well as polycondensation process with di- and polyhydroxy alcohols under a reduced pressure, wherein a baseline material in the polycondensation process is a water layer separated from the residues left over after the hydrolysis of cyclohexyl esters contained in the cyclohexane oxidation product, and after the main components, cyclohexanol and cyclohexanon, have been, at first, separated from the said product: thereafter, the water layer is condensed, wherein
the baseline material used contains adipic acid amounting to 20-27% by weight, 6-hydroxycaproic acid amounting to 10-15% by weight; valeric acid amounting to 10-13% by weight, butyric acid amounting to maximum 45% by weight, acetic acid in the amount of 2-3% by weight, hexanoic (caproic) acid in the amount of 1 to 3% by weight; formic acid amounting to max 1.5% by weight, succinic acid amounting to maximum 1% by weight, propanoic (propionic) acid in the amount of max 1% by weight, isovaleric acid amounting to max 0.5% by weight, other non-identified compounds in the amount of 24-25% by weight such as:
oligomers, ketoacids, cyclohexanone dimmers, and other compounds including tar substances, and water amounting to 10-22% by weight in terms of total weight of the mixture.

2. A method to manufacture polyester resins using a by-product formed during a process of oxidizing cyclohexane to
cyclohexanol and cyclohexanone, which contains a mixture of carboxyl acids, and this method comprises a heating process with the removal of water and low-boiling residues, as well as polycondensation process with di- and polyhydroxy alcohols under a reduced pressure, wherein a baseline material in the polycondensation process is a water layer separated from the residues left over after the hydrolysis of cyclohexyl esters contained in the cyclohexane oxidation product, and after the main components, cyclohexanol and cyclohexanon, have been, at first, separated from the said product: thereafter, the water layer is condensed,
which further contains a monocarboxyl acids that contains from 1 to 6 carbon atoms in the molecule, amounting to 20-30% by weight, especially hydroxycaproic acids, dicarboxylic acids, that contain from 3 to 6 carbon atoms in the molecule, amounting to 25-40% by weight, especially adipic acids; cyclohexyl esters of these acids, keto acids and other unidentified compounds amounting to 15-25° % by weight and 10-20 weight percent of water, by heating their and polycondensation with di- and polyhydroxy alcohols under a reduced pressure or normal pressure, at a temperature of 160-270 deg. C. characterized in that, in the polycondensation process a water layer separated from the residues left over after the hydrolysis of cyclohexyl esters contained in the cyclohexane oxidation product, and after the main components, cyclohexanol and cyclohexanon, have been, at first, separated from the said product; thereafter, the water layer is condensed in known manner, wherein a water layer contains: adipic acid amounting to 20-27% by weight, 6-hydroxycaproic acid amounting to 10-15% by weight, valeric acid amounting to 10-13% by weight, butyric acid amounting to maximum 4.5% by weight, acetic acid in the amount of 2-3% by weight, hexanoic (caproic) acid in the amount of 1 to 3% by weight, formic acid amounting to maximum 1.5% by weight, succinic acid amounting to maximum 1% by weight, propanoic (propionic) acid in the amount of maximum 1% by weight, isovaleric acid amounting to maximum 0.5% by weight, other non-identified compounds in the amount of 24-25% by weight such as oligomers, ketoacids, cyclohexanone dimmers, and other compounds including tar substances, and water amounting to 10-22% by weight in terms of total weight of the mixture, wherein
monofunctional compounds can be recovered in the form of a by-product during the polycondensation phase and that by-product might be utilized as a raw material in other synthesis reactions or might be used as a commercial product.

3. The method to manufacture polyester resins using a by-product formed during a process of oxidizing cyclohexane to cyclohexanol and cyrclohexanone, which contains a mixture of carboxyl acids, and this method comprises a heating process with the removal of water and low-boiling residues, as well as polycondensation process with di- and polyhydroxy alcohols under a reduced pressure, wherein a baseline material in the polycondensation process is a water layer separated from the residues left over after the hydrolysis of cyclohexyl esters contained in the cyclohexane oxidation product, and after the main components, cyclohexanol and cyclohexanon, have been, at first, separated from the said product: thereafter, the water layer is condensed,
wherein
a monofunctional compounds can be recovered in the form of a by-product during the polycondensation phase and that by-product might be utilized as a raw material in other synthesis reactions or might be used as a commercial product.

* * * * *